L. TAXON.
UNIVERSAL SOUND REPRODUCER AND ARM.
APPLICATION FILED FEB. 7, 1917.
1,240,267.
Patented Sept. 18, 1917.
2 SHEETS—SHEET 1.
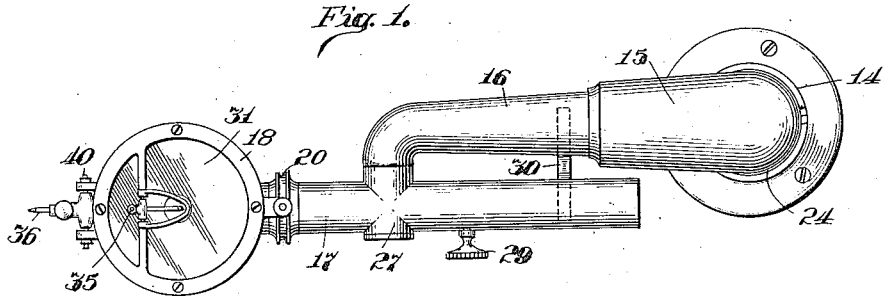
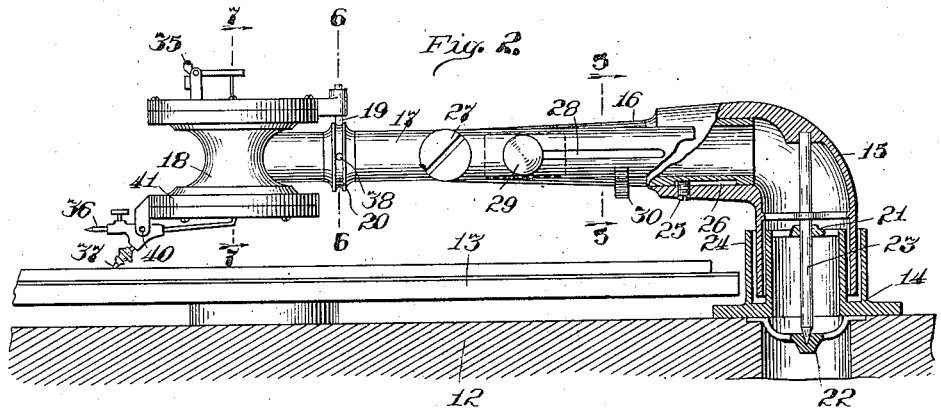
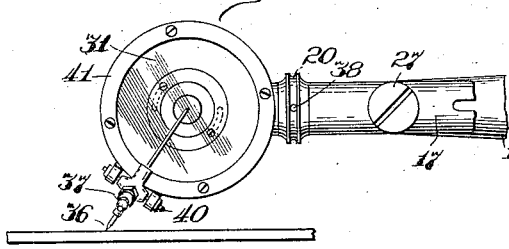 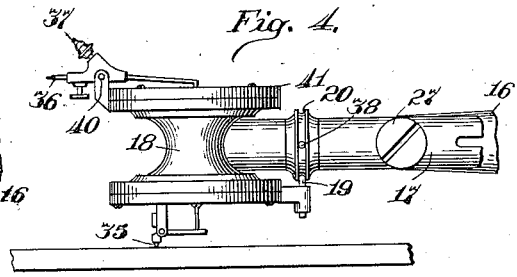
Inventor
Louis Taxon
By Wm. F. Belt
Attorney.

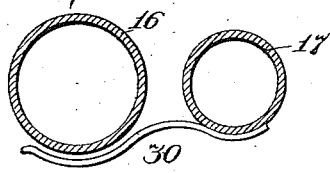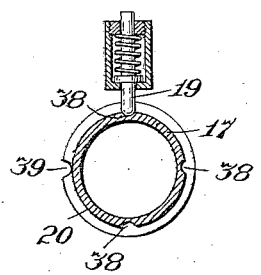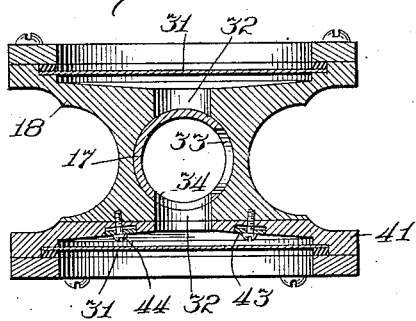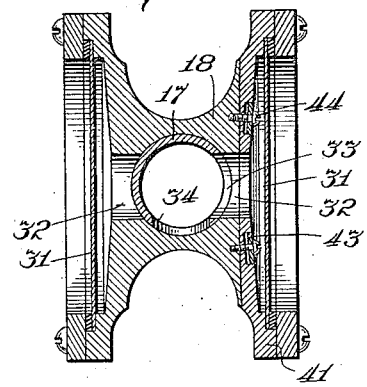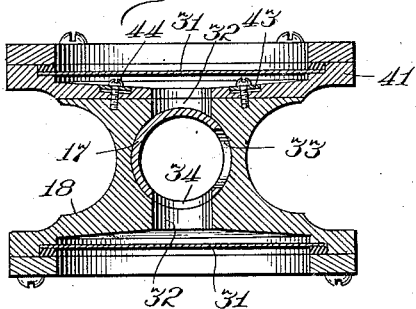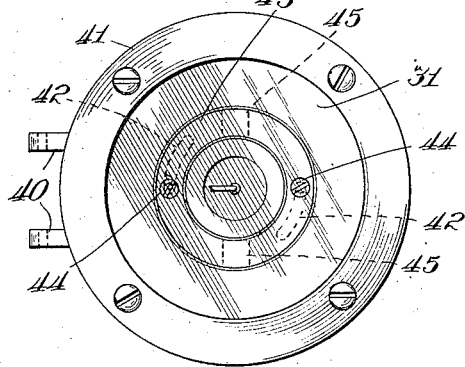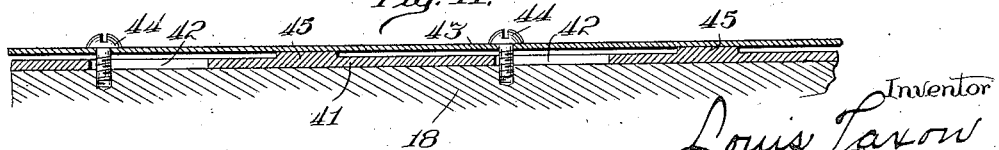

UNITED STATES PATENT OFFICE.

LOUIS TAXON, OF ROCKFORD, ILLINOIS, ASSIGNOR, BY MESNE ASSIGNMENTS, TO THE BRUNSWICK-BALKE-COLLENDER COMPANY, OF CHICAGO, ILLINOIS, A CORPORATION OF DELAWARE.

UNIVERSAL SOUND REPRODUCER AND ARM.

1,240,267.   Specification of Letters Patent.   Patented Sept. 18, 1917.

Application filed February 7, 1917. Serial No. 147,254.

*To all whom it may concern:*

Be it known that I, LOUIS TAXON, a citizen of the United States, residing at #1823 Charles street, Rockford, in the county of Winnebago and State of Illinois, have invented a new and useful Universal Sound Reproducer and Arm, of which the following is a specification.

My invention relates to talking machines which will successfully reproduce sounds from any known disk record, and the objects of my improvements are, first, to provide an adjustable sound reproducer provided with a plurality of tracker needles or styli; second, to provide a rotating adjustment and a sliding adjustment for the sound reproducer; third, to have a sliding bar or adjustable weight in connection with the sound reproducer; fourth, to provide a liquid joint in the swinging sound arm; fifth, to make a simple, effective and durable device and other features to become apparent from the description to follow.

As is known to those versed in the art to which my invention pertains there are now several different styles of disk records made for talking machine, viz., some hill and dale cut records to be played by a sharp pointed stylus or needle; some known as the diamond disk to be played with a diamond point; other hill and dale cut records to be played by a ball pointed stylus and lateral cut records to be played by a sharp pointed needle or stylus. By the use of my invention any one of said records can be played by simply adjusting the sound reproducer to suit the particular record to be played without changing the needle or stylus. Furthermore the sound reproducer is so constructed that it is at all times free from improper vibrations by having two opposing diaphragms mounted on a solid central connecting body which forms a rigid back wall for each diaphragm, and the sound arm is provided with a liquid seal at its pivotal joint thus preventing escape of air from the column thereof within the tone arm.

To describe my invention so that others versed in the art to which it pertains can make and use the same I have illustrated it on the accompanying two sheets of drawings forming a part of this specification and in which:

Figure 1, is a plan view of a talking machine sound reproducer and arm embodying my invention; Fig. 2, is a side elevation partly in section of the same showing the ball pointed stylus in contact with the record disk; Fig. 3, is a similar view partly broken away showing the sharp pointed stylus for the lateral cut records in contact with the record disk; Fig. 4, is a similar view partly broken away showing the diamond pointed stylus in contact with the record disk; Fig. 5, is a detail sectional view enlarged taken on line 5—5 of Fig. 2 showing the construction of the sound arm; Fig. 6, is a detail sectional view on line 6—6 of Fig. 2, enlarged showing the spring lock for the sound reproducer; Fig. 7, is a sectional view taken on line 7—7 of Fig. 2, showing the position of the sound reproducer on the sound arm when the same is in position to have the ball pointed stylus or sharp pointed needle contact with the record disk; Fig. 8, is a similar view showing the position of the sound reproducer on the sound arm when the same is in a position to have the sharp pointed stylus or needle for the lateral cut record contact with the record disk; Fig. 9, is a similar view showing the position of the sound reproducer on the sound arm when the same is in a position to have the diamond pointed stylus contact with the diamond disk record; Fig. 10, is an enlarged face view of the movable diaphragm of the sound reproducer and Fig. 11 is an annular sectional view taken on line 11—11, of Fig. 10, showing the construction of the frictional ring employed on the sound reproducer.

Similar reference characters refer to similar parts throughout the several views.

The top of the cabinet is shown at 12 and the usual revolving disk plate at 13. The sound arm comprises four sections, the stationary section 14, the elbow or pivotal section 15, the sliding section 16, and the tilting section 17. The sound reproducer 18 is adjustably mounted on the forward free end of the tilting section 17, by being provided with a hole into which the tubular end of the tilting section 17 is snugly fitted. The said tubular end of section 17 is held in position with its extremity against the bottom of the hole in the sound reproducer 18 by means of a spring pressed latch 19 engaging an annular groove 20 provided on the section 17. The spring pressed latch 19 engaging the annular groove 20 prevents the sound reproducer 18 being removed from section 17 except by exerting sufficient force and yet permits sound reproducer 18 to be turned on the section 17 as an axis.

The stationary part 14 of the sound arm is rigidly secured to the top 12 of the cabinet as usual and is provided with the upper bearing 21 and the lower bearing 22 in which is rotatably mounted the vertical shaft 23 rigidly secured to the elbow 15. The section 14 is provided with an annular trough 24 into which the lower tubular vertically disposed end of the elbow 15 extends. The trough 24 is partly filled with liquid, preferably oil, so that the lower end of said elbow 15 is submerged and a liquid seal is thus formed between the elbow 15 and the stationary section 14 and prevents any possible escape of air from the air column within the tone arm.

The sliding section 16 is mounted to slide in a substantially horizontal plane in the elbow 15, and has its movement in both directions limited by means of a pin or screw 25, which is secured in the elbow 15, contacting with the ends of slot 26 provided in the sliding section 16. The outer extremity of the sliding section 16 is bent in a right angle to one side and has loosely pivoted thereon at 27 the tilting section 17 to swing in a vertical plane. The sound reproducer 18 is secured on the end of the tilting section 17 forward of the pivotal point 27, and the end of the tilting section 17 to the rear of said pivot 27 is provided with a weight 28, conveniently placed inside of the tubular portion of same, which is made movable toward and away from the pivot 27 for the purpose of variably counter-weighing the sound reproducer 18. I conveniently provide a thumb screw 29 in the weight 28 extending through a slot 30 in the tilting section 17 by means of which the weight 28 is moved and secured in place.

Obviously the forward end of the tilting section carrying the sound reproducer 18 is heavier than the rear end of same and will naturally tend to swing down until contacting with some stop which when the machine is in operation is always the record disk; however, a stop is provided for said tilting section when the machine is not in operation and comprises an arm 30 secured to the section 17 and extending laterally underneath the section 16 so that the upward movement of the rear end of the tilting section 17 is limited by the free end of arm 30 contacting with the under side of section 16.

The body of the sound reproducer 18 is constructed of one piece of metal, and is of a spool-like shape having a diaphragm 31 secured on each end in the usual manner. The hole into which is fitted the tubular end of the tilting section 17 is provided in the center connecting part of the sound reproducer 18 midway between the diaphragms 31 and the sound from the diaphragms passes through the communicating openings 32 to the central hole in which the end of the sound arm section 17 is secured. Said end of the sound arm section 17 which is within the hole in the sound box 18 is provided with two lateral openings 33 and 34. The axis of the opening 33 extends in a horizontal plane and the axis of the opening 34 extends substantially in a vertical plane.

In operative connection with the one diaphragm 31 I arrange a diamond stylus 35 to be used in connection with a diamond disk record, i. e., a record in which the sound vibrations are recorded by hill and dale cuts to be played by a diamond point.

In operative connection with the other diaphragm 31, I arrange two styli, the one having a removable sharp pointed needle 36 to play the lateral cut records and the other having a ball pointed needle 37 to play the hill and dale cut records which can also be removed and a sharp pointed needle used. As indicated in Figs. 2, 3 and 4 and Figs. 7, 8 and 9, the sound reproducer 18 is placed in any one of three positions to play with any one of the stylus points 37, 36 or 35. In Figs. 2 and 7 the sound reproducer 18 is in a position to have the stylus point 37 contact with the record disks; in Figs. 3 and 8 the sound reproducer 18 is in a position to have the stylus needle 36 contact with the record disk, and in Figs. 4 and 9 the sound reproducer 18 is in a position to have the diamond pointed stylus 35 contact with the record disk. Thus it will be noted that the sound reproducer 18 has three operative positions about its axis each ninety degrees from the other. To retain the sound reproducer in any one of said three positions the annular groove 20 is provided with three depressions 38 spaced ninety degrees apart with which the spring pressed latch 19 cooperates as clearly shown in Fig. 6.

To facilitate the removal and replacing of the sound reproducer 18 from the sound arm section 17 the one wall of the groove 20 is cut away at 39 sufficiently to permit the protruding end of the latch 19 to pass out of said groove 20.

It will be noted that in Fig. 7, the position of the sound reproducer 18 is such that the hole 34 in the sound arm extension 17 registers with the hole 32 leading to the diaphragm which is being used, and the hole leading to the other diaphragm is closed, thus preventing any disturbance of said other diaphragm. Similarly when the sound reproducer 18 is in the positions shown in Figs. 8 and 9 the hole 32 leading to the unused diaphragm is sealed and also prevents any disturbance of the unused diaphragm.

It will be noted that the needles 36 and 37 are farther from the pivotal shaft 23 than is the diamond point 35, and since it is necessary to secure the best results to have the tracker styli at such distance from the said pivotal shaft 23, when in use, that the stylus will properly track in the line of indentations on the record disk it becomes necessary to slightly shorten the sound arm to use the needles 36 and 37 and lengthen the same to use the diamond point 35, and to thus vary the length of the sound arm I arrange two parts of the said arm which telescope one in the other. As clearly shown in Figs. 1 and 2, the horizontal part of the elbow 15 is bored out to have the tubular end of section 16 snugly fit the same, so it can be easily slid in and out of said elbow, i. e., toward and away from the pivotal shaft 23. As above described said sliding movement is limited by means of the set screw or pin 25.

Obviously when the diamond point 35 is to be used the section 16 is moved out away from the pivotal shaft 23, and when either the stylus 36 or the stylus 37 is to be used the section 16 is moved in toward the pivotal shaft 23.

To secure the best results from different records it requires that some styli engage the record disk with greater pressure than others, therefore when it is desired to have greater weight on the styli, the weight 28 is moved to its extreme left hand position as viewed in Figs. 1 and 2, and when less weight is desired the weight 28 is moved to its extreme right hand position.

The styli 36 and 37 are conveniently connected to the same vibrating arm which is connected to the diaphragm 31 and is mounted on a hinge at 40 secured to the end 41 of the spool-like sound reproducer 18. It will be noted that in Fig. 2, the end 41 of the sound reproducer 18 is in a position with the stylus 36 in a line parallel to the axis of the tubular tilting section 17, while in Fig. 3, said end 41 is in a position with the stylus 36 in a line at an angle of about forty five degrees to the axis of the tubular tilting section 17. It is necessary to thus shift the end 41 to have the stylus 37 properly track on the record disk and also to have the stylus 36 properly track on the record disk when respective styli are used. The end 41 carrying the diaphragm 31 and the styli 36 and 37 is therefore mounted adjustably on the sound reproducer 18 of which it forms a part. As clearly shown in Figs. 10 and 11, the end 41 is provided with a plurality of concentric arcuate slots 42 and a spring ring 43, is clamped against the flat surface of said end 41 by means of screws 44 passing through the slots 42 and secured in the body of the sound reproducer 18. The length of the slots 42 serve to limit the movement of the end 41 in both directions by the screws 44 contacting with the ends of the slots. The ring 43 is preferably snugly fitted into a circular groove so as to serve as a guide for the turning of the end 41 from one position to the other. Slight protrusions 45 may be provided on the end 41 to contact with the underside of the spring ring 43 to insure a constant friction between the parts and to compensate for wear.

The record disks which are used in connection with the diamond pointed needle 35 are about twice as thick as the record disks which are used in connection with stylus 36 or the ball pointed stylus 37, and the stop arm 30 on the tilting section 17 are positioned so that all three styli 35, 36 and 37 can only drop a sufficient distance to transmit the vibrations from the record to the diaphragm. Thus the diamond pointed needle 35 cannot contact with either of the records used in connection with the other two styli 36 and 37, if by error a person should attempt to place the diamond pointed stylus 35 on the wrong record.

It will be understood that the material, size and arrangement of the parts may be changed without departing from the scope of my invention or sacrificing any of its material advantages.

Having thus fully described my invention what I claim as new and desire to secure by Letters Patent of the United States is:

1. In a device of the class described, a sound arm provided with lateral perforations in its end communicating with its interior, and a sound reproducer provided with two diaphragms lying in parallel planes and with holes to register with the lateral perforations in the sound arm, said parts being so arranged that the hole communicating with the unused diaphragm will be closed and the hole communicating with the used diaphragm will register with one of the lateral perforations in the sound arm.

2. A device of the character described including a tone arm, a sound conducting tube pivotally mounted on and communicating with said tone arm, a sound box mounted on said tube, said tube having an extension on the side of its pivotal axis opposite said sound box, and a weight adjustably mounted in said tube to counterbalance the weight of said sound box.

3. A device of the character described including a tone arm, a sound conducting tube pivotally mounted on and communicating with said tone arm, a sound box mounted in said tube and selectively adjustable thereon to a plurality of positions, said tube being provided with an extension on the side of its pivotal axis opposite said sound box and a weight adjustably mounted in said tube to vary the effective weight of the sound box.

4. A device of the character described including a tone arm, a sound conducting tube pivotally mounted on and communicating with said tone arm, a sound box adjustably mounted in said tube and having means to support a plurality of styli, each of which is operative when said sound box is adjusted to a predetermined position, said tube being provided with an extension on the side of its pivotal axis opposite said sound box and a weight adjustably mounted in said tube to vary the effective weight of the sound box.

5. A device of the character described including a tone arm, a sound conducting tube pivotally mounted on and communicating with said tone arm, a sound box having two diaphragms arranged in parallel planes, said sound box being selectively adjustable to a plurality of positions wherein one or the other of said diaphragms are operative, said tube having an extension on the side of its pivotal axis opposite said sound box, and a weight adjustably mounted in said tube to vary the effective weight of the sound box.

6. A device of the character described including a tone arm, a sound conducting tube pivotally mounted on and communicating with said tone arm, a sound box adjustably mounted on said tube and having means to support a plurality of styli, each of which is operative when said sound box is adjusted to a predetermined position, said tube having an extension on the side of its pivotal axis opposite said sound box and a weight adjustably mounted in said tube to partially and variably compensate the weight of said sound box whereby the effective pressure of said styli is varied to meet the requirements of sound records of different characters.

7. A device of the character described including a longitudinally extensible tone arm, a sound conducting tube pivotally mounted on said tone arm, a sound box adjustably mounted on said tube and having means to support a plurality of styli, each of which is operative when said sound box is adjusted to a predetermined position, said tube having an extension on the side of its pivotal axis opposite said sound box and a weight adjustably mounted in said tube to partially and variably compensate the weight of said sound box whereby the effective pressure of said styli is varied to meet the requirements of sound records of different characters.

8. A device of the character described including a longitudinally extensible tone arm, a sound conducting tube pivotally mounted on said tone arm and communicating therewith, a sound box adjustably mounted for rotation about the longitudinal axis of said tube, said tube having an extension on the side of its pivotal axis opposite said sound box, and a weight adjustably mounted in said tube to partially and variably compensate the weight of said sound box.

9. A device of the character described including a longitudinally extensible tone arm, a sound conducting tube pivotally mounted on said tone arm and communicating therewith, a sound box adjustably mounted for rotation about the longitudinal axis of said tube, said tube having an extension on the side of its pivotal axis opposite said sound box, a weight adjustably mounted in said tube to partially and variably compensate the weight of said sound box, and means for locking said weight in adjusted position.

10. A device of the character described including a tone arm, a sound conducting tube pivotally mounted on and communicating with said tone arm, a sound box mounted on said tube, said tube having an extension on the side of its pivotal axis opposite said sound box, a weight within said extension, a slot in the side of said extension, and a screw extending through said slot and engaging said weight to lock the latter in adjusted position.

11. In a device of the class described, a sound box and a stylus, a tone arm provided with a vertically disposed pivot at the rear end thereof and comprising a rear section and a forward tilting section, a horizontal pivot connecting the rear section and said tilting section, a tube extending on the opposite side of said horizontal pivot from the stylus and integral with the tilting section, said tube being provided with a longitudinal slot and a weight within said tube arranged to be shifted therein by means of a handle extending through the slot.

In testimony whereof I have signed my name to this specification in presence of two subscribing witnesses this 2d day of November, 1916, at Rockford, Illinois.

LOUIS TAXON.

Witnesses:
GUST PETERSEN,
RICHD. J. JACKER